May 3, 1960  R. A. CHRISTIE  2,935,089
CONTROL MEANS FOR HYDRAULIC RAMS
Filed Aug. 30, 1954  2 Sheets-Sheet 1

INVENTOR.
Reginald A. Christie
BY
Paul O. Pippel
Atty.

May 3, 1960  R. A. CHRISTIE  2,935,089
CONTROL MEANS FOR HYDRAULIC RAMS
Filed Aug. 30, 1954  2 Sheets-Sheet 2
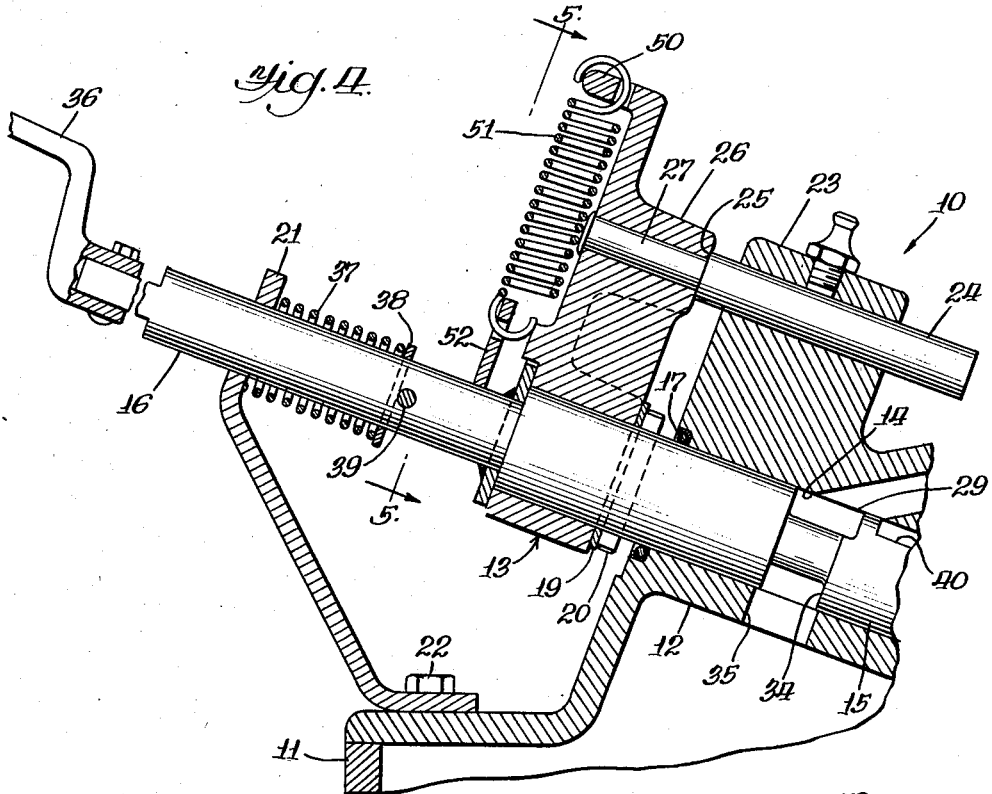
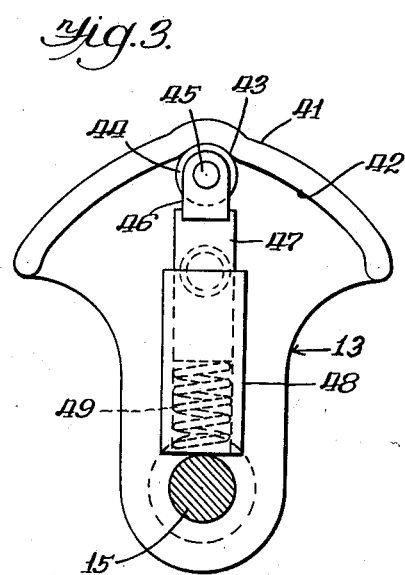
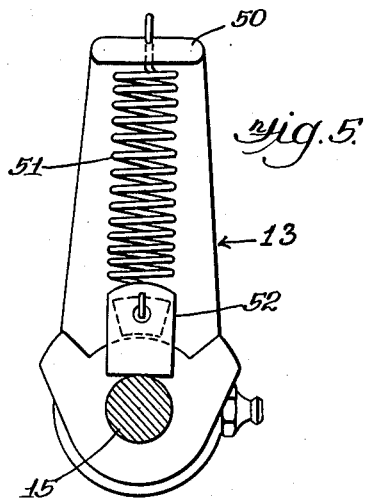
INVENTOR.
Reginald A. Christie
BY
Paul O. Pippel
Atty.

United States Patent Office 2,935,089
Patented May 3, 1960

2,935,089

CONTROL MEANS FOR HYDRAULIC RAMS

Reginald A. Christie, Glanford, Ontario, Canada, assignor to International Harvester Company, a corporation of New Jersey Application August 30, 1954, Serial No. 453,012

4 Claims. (Cl. 137—620)

This invention relates to apparatus for controlling the operation of agricultural implements and the like, and particularly to valve mechanism for controlling the flow of fluid under pressure to a plurality of hydraulic rams.

Many implements for agricultural and other purposes have a number of movable parts which are independently operated, and it is customary to mount two or more hydraulic rams on the implement for the purpose of operating these movable parts. For instance, in tractor propelled moldboard plows, it is sometimes desirable to raise and lower the wheels independently for leveling, depth control, etc., and separate rams may be employed for this purpose. Likewise, in grain harvesting machines such as windrowers, it is desirable to provide separate rams for raising and lowering the grain platform and the reel.

An object of the present invention is the provision of simplified and efficient control means for the operating rams of agricultural implements and the like.

Another object of the invention is the provision of novel valve means for controlling the flow of fluid under pressure to hydraulic rams and the like.

A further object of the invention is the provision of simple and efficient means for controlling the flow of fluid under pressure to a plurality of hydraulic rams involving the use of a single actuating member or lever.

Another object of the invention is the provision of a control valve structure for the delivery of hydraulic fluid independently to a pair of hydraulic rams, wherein the valve shaft or plunger by which the fluid is directed to the selected channels is both rotatable and axially slidable in the performance of its functions.

Other objects and advantages of the invention will become clear from the following detailed description when read in conjunction with the accompanying drawings, wherein:

Figure 3 is a view taken on the line 3—3 of Figure 1;

Figure 4 is a vertical sectional view of a modified form of the invention; and

Figure 5 is a view taken on the line 5—5 of Figure 4.

Figure 1:
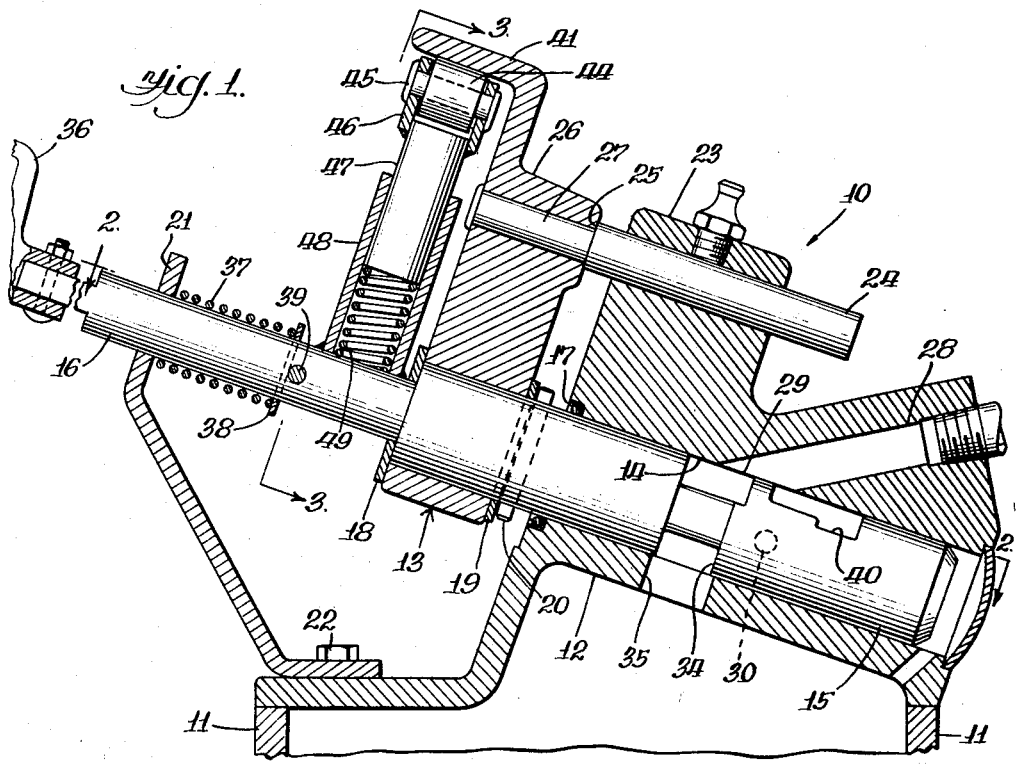
Figure 1 is a vertical sectional view through a valve apparatus incorporating the features of this invention.

Referring to the drawings, the numeral 10 designates generally a valve housing mounted upon a suitable support 11 and including a stationary part 12 and a movable part 13. The valve housing is provided with a valve chamber 14 in which is rotatably mounted and axially slidable, a valve shaft or plunger 15 having a stepped-down stem portion 16 of smaller diameter than the main valve shaft portion and projecting exteriorly of the valve housing. A suitable packing 17 is provided for the stationary housing portion 12, and the movable housing portion 13 is held on the valve plunger by a collar 18 secured to the plunger and another collar 19 held in place by a pin 20.

The projecting end 16 of the plunger 15 is slidably received in an opening provided in a bracket 21 secured to the valve housing 10 by a bolt 22. The stationary part 12 of the valve housing is provided with an upwardly projecting extension 23 which is suitably bored to slidably receive a guide rod 24 having a shoulder 25 abutting an upper extension 26 of the movable housing portion 13, the latter being suitably bored to receive a stepped-down portion 27 of the guide rod 24. When the plunger 15 is longitudinally reciprocated in the valve chamber 14, the guide rod 24 guides the movable housing portion 13 in its movement with the plunger and prevents its rotation relative to the stationary housing portion 12.

Hydraulic fluid under pressure from a supply source, not shown, such as a pump and reservoir on a tractor or on the implement frame, is delivered to the valve housing 10 through a conduit 28 in the housing providing a supply port 29 discharging into the valve chamber 14 to be delivered to a pair of hydraulic rams, also not shown, through a pair of ram feed ports 30 and 31, fluid being delivered to the rams through the respective hose lines 32 and 33.

Figure 2:
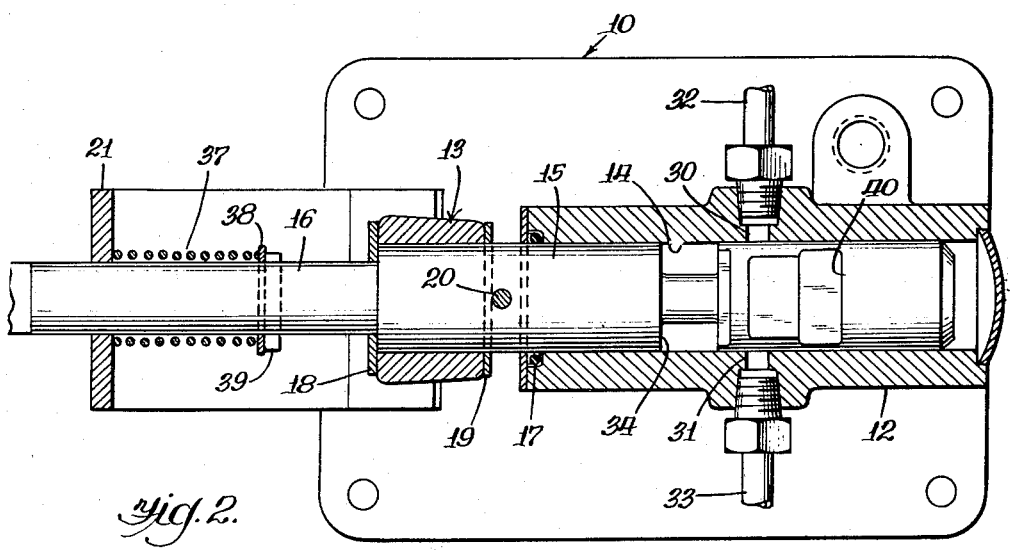
Figure 2 is a sectional plan view of the structure shown in Figure 1 taken on the line 2—2 thereof.

In the position of the parts shown in Figure 1, for example, the port 29 is in registry with an annular opening 34 and a return port 35 in the valve housing. In this position of the parts, therefore, fluid is simply by-passed through the valve and back to the supply source. In order to actuate one of the rams and deliver fluid under pressure thereto, the operator grasps a handle 36 of any suitable form, secured to the projecting end of the valve plunger, and slides the valve plunger outwardly with respect to the valve housing. This action is resiliently resisted by a spring 37 surrounding the stepped-down portion 16, and abutting the bracket 21 at one end and a collar 38 at its other end, the collar 38 being held in place by a pin 39. The plunger 15 is thus urged into the position indicated in Figure 1. The position of the ram feed ports is shown in Figure 2 and indicated in dotted lines in Figure 1. When the operator has retracted the plunger 15, the annular opening 34 moves forwardly past the ports 29 and 35 so that fluid no longer flows therethrough. At this point a groove or notch 40 in the plunger 15 comes into registry with the supply port 29. The operator then rotates or rocks the plunger in one direction or the other, so that the groove 40, in addition to being in communication with the port 29, also comes into registry with the selected port 30 or 31 and functions as a plunger discharge port for feeding fluid to the selected ram. The dimensions of groove 40 are such that with the plunger 15 in the position to close off port 35 and provide communication between supply port 29 and one of the ram ports 30 or 31, an additional turn of the plunger will move the groove past port 29 to block it and establish communication between groove 40, discharge port 35 and the ram port 30 or 31 to exhaust fluid therefrom.

In the position of the parts shown in Figure 1, the valve plunger 15 is in a neutral position with respect to the ram feed ports 30 and 31, and the plunger is biased at all times to this neutral position by means comprising an arcuately shaped cam member 41 forming a part of the movable housing portion 13, and having a shape as indicated in Figure 3. The member 41 is provided with an arcuately shaped cam face or engaging surface 42 and a central depression or groove 43. The cam face 42 is engaged by a follower in the form of a roller 44 mounted upon a pin 45. Pin 45 is carried between the arms 46 at the upper end of a member 47, which is slidably received in a sleeve 48 welded to the stepped-down portion 16 of the plunger 15. A spring 49 in the sleeve 48 engages the plunger at one end and the member 47 at its other to urge the roller 44 into engagement with the cam surface 42. The spring 49 biases the roller 44 to return to a central normal and neutral position within the groove 43. Since the housing portion 13 moves with the plunger 15 as it is reciprocated in the valve housing, the roller 44 remains in engagement with the cam surface 42 throughout its range of sliding movement, and the spring 49 is effective at all times to urge the roller to ride up the cam surface toward the groove 43.

A modified form of the biasing means of this invention is shown in Figures 4 and 5, wherein like numbers designate like parts and wherein only the movable housing portion 13 is constructed somewhat differently from that shown in Figures 1 to 3. The movable housing portion 13 shown in Figure 4 is provided with a lug 50 to which is anchored one end of a spring 51. The other end of the spring 51 is anchored to a lug 52 secured to the stepped-down portion 16 of the plunger 15. The spring 51 is vertically positioned in the neutral position of the valve plunger, and tension is placed thereon as the plunger is rocked by means of the lever 36 to one side or the other to actuate one or the other of the hydraulic rams.

The operation of the control valve apparatus of this invention should be clearly understood from the foregoing description. It should likewise be understood that modifications may be made in the invention without departing from the spirit thereof or the scope of the appended claims.

What is claimed is:

1. In a control valve, a housing, a valve chamber in the housing having supply, return and feed ports, a valve plunger rotatably mounted in the chamber having a discharge opening therein, means operatively connected to said plunger for rocking it about its axis to opposite sides of a neutral position to alternately place the respective of said feed ports in registry with said supply port and said plunger discharge opening, biasing means operatively connected between the plunger and the housing for urging the plunger to its neutral position, said biasing means comprising a cam member mounted on the plunger for rotation of the latter therein having an arcuately shaped camming surface thereon, a cam follower mounted on the plunger for rotation therewith and engageable with said camming surface for movement thereover to opposite sides of a normal neutral position, and spring means urging said cam follower into engagement with the cam.

2. In a control valve, a housing, a valve chamber in the housing having supply, return and feed ports, a valve plunger rotatably mounted in the chamber having a discharge opening therein, means operatively connected to said plunger for rocking it about its axis to opposite sides of a neutral position to alternately place the respective of said feed ports in registry with said supply port and said plunger discharge opening, biasing means operatively connected between the plunger and the housing for urging the plunger to its neutral position, said biasing means comprising a movable housing portion in which the plunger is rotatably mounted, said movable housing portion and said plunger being axially movable to and from a non-operating position with respect to said supply and return ports, a part projecting from said plunger, and a spring connected at one end to said part and at its other end to said movable housing portion.

3. In a control valve, a housing, a valve chamber in the housing having supply, return and feed ports, a valve plunger rotatably mounted in the chamber having a discharge opening therein, means operatively connected to said plunger for rocking it about its axis to opposite sides of a neutral position to alternately place the respective of said feed ports in registry with said supply port and said plunger discharge opening, biasing means operatively connected between the plunger and the housing for rotatably urging the plunger to its neutral position, said biasing means comprising a movable housing portion in which the plunger is rotatably mounted, said movable housing portion and said plunger being axially movable to and from a non-operating position with respect to said supply and return ports, a cam face formed on said movable housing portion, a support member mounted on said plunger for rotation and axial sliding movement therewith, a cam follower carried by said support engageable with said cam face, and spring means urging the follower into engagement with the face.

4. In a control valve, a housing, a valve chamber in the housing having supply, return and feed ports therein, a valve plunger mounted for rotation and axial reciprocation in the chamber having a discharge opening therein alternately communicative with said feed ports, means for rotating said plunger in one direction from a neutral position to a position with said discharge opening in registry with said supply port and one of said feed ports, and in the other direction with said plunger opening in registry with said supply source and another of said feed ports, and spring means reacting between said housing and said plunger for rotatably biasing the latter to its neutral position throughout the range of axial reciprocation thereof.

References Cited in the file of this patent

UNITED STATES PATENTS

| | | |
|---|---|---|
| 1,339,332 | Greenly | May 4, 1920 |
| 2,115,950 | Gurries | May 3, 1938 |
| 2,367,194 | Boldt | Jan. 16, 1945 |
| 2,471,289 | Sedgwick | May 24, 1949 |
| 2,547,254 | Braithwaite | Apr. 3, 1951 |
| 2,564,444 | Parsons | Aug. 14, 1951 |
| 2,655,167 | Dunkelow | Oct. 13, 1953 |